(12) United States Patent
Weber et al.

(10) Patent No.: US 10,850,781 B2
(45) Date of Patent: Dec. 1, 2020

(54) MOTOR VEHICLE BODY HAVING AN AIR-GUIDING UNIT

(71) Applicant: Dr. Ing. h.c. F. Porsche Aktiengesellschaft, Stuttgart (DE)

(72) Inventors: Sebastian Weber, Esslingen (DE); Joachim Paul, Benningen a.N. (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 10 days.

(21) Appl. No.: 16/278,245

(22) Filed: Feb. 18, 2019

(65) Prior Publication Data
US 2019/0283815 A1    Sep. 19, 2019

(30) Foreign Application Priority Data
Mar. 15, 2018    (DE) .......... 10 2018 105 960

(51) Int. Cl.
*B62D 35/00*    (2006.01)
*B62D 37/02*    (2006.01)

(52) U.S. Cl.
CPC .......... *B62D 35/007* (2013.01); *B62D 37/02* (2013.01)

(58) Field of Classification Search
CPC ....... B62D 35/00; B62D 35/007; B62D 37/02
USPC .......................................... 296/180.1, 180.5
See application file for complete search history.

(56) References Cited

U.S. PATENT DOCUMENTS

| 5,141,281 A | 8/1992 | Eger et al. |
|---|---|---|
| 2007/0145776 A1* | 6/2007 | Grave .................. B62D 35/007 296/180.5 |
| 2009/0160215 A1 | 6/2009 | Paul et al. |
| 2010/0026044 A1 | 2/2010 | Ramin et al. |
| 2011/0181076 A1 | 7/2011 | Posch et al. |

FOREIGN PATENT DOCUMENTS

| DE | 4014380 A1 | 11/1991 |
|---|---|---|
| DE | 10309369 | 9/2004 |
| DE | 102007061812 A1 | 7/2009 |
| DE | 102008036188 B4 | 2/2010 |
| DE | 102010006502 A1 | 8/2011 |
| FR | 2874579 A1 | 3/2006 |

* cited by examiner

*Primary Examiner* — Dennis H Pedder
(74) *Attorney, Agent, or Firm* — Leydig, Voit & Mayer, Ltd.

(57) ABSTRACT

A motor vehicle body includes an air-guiding unit having an air-guiding element configured to be positioned flush with the motor vehicle body and movably connected to the motor vehicle body and an adjustment unit including an actuation element arranged fixedly on a support element of the motor vehicle body and configured to aid movement of the air guiding element. The motor vehicle body further includes a receiving space configured to receive the air-guiding element, wherein the receiving space is arranged in a rear region of the motor vehicle body. The support element is designed in a form of a torsional profile for reinforcing a rear lid, forming the receiving space, of the rear region.

10 Claims, 3 Drawing Sheets

MOTOR VEHICLE BODY HAVING AN AIR-GUIDING UNIT

CROSS REFERENCE TO RELATED APPLICATIONS

This application claims benefit to German Patent Application No. DE 10 2018 105 960.4, filed Mar. 15, 2018, which is hereby incorporated by reference herein.

FIELD

The invention relates to a motor vehicle body having an air-guiding unit able to be positioned flush with the motor vehicle body and movably connected to the motor vehicle body.

BACKGROUND

Motor vehicle bodies having an air-guiding unit are known. The motor vehicle body is in particular a motor vehicle body whose air-guiding unit has an air-guiding element in the form of a movable so-called rear wing. The rear wing is, with the aid of an adjustment unit, movably received at the motor vehicle body and can thus assume, relative to the motor vehicle body, different positions between a first end position and a second end position. In the first position, the rear wing is arranged flush with the motor vehicle body, and, in the second end position, said wing is spaced apart from the motor vehicle body to the maximum extent. With the aid of the rear wing, it is in particular possible for a downforce and an air resistance coefficient of the motor vehicle body to be varied. For the purpose of receiving the rear wing, a receiving space into which the rear wing can be received in its first end position is formed in the rear region of the motor vehicle body. Also received in said receiving space is the adjustment unit with its kinematic arrangement, the latter moving and stabilizing the rear wing.

A motor vehicle body is known from the laid-open specification DE 10 2008 036 188 B4, wherein the motor vehicle body has a movable rear wing, whose adjustment unit is received at a support part. The support part is connected to a rear paneling of the motor vehicle body, which leads to it contributing to an increase in a stiffness of the rear paneling.

The laid-open specification FR 2 874 579 A1 discloses a motor vehicle body which has a movable rear wing. A rear interior is largely covered with respect to the rear wing with the aid of a shell-shaped cover element, wherein the cover element forms, together with an adjacent body element, a closed profile.

SUMMARY

In an embodiment, the present invention provides a motor vehicle body. The motor vehicle body includes an air-guiding unit having an air-guiding element configured to be positioned flush with the motor vehicle body and movably connected to the motor vehicle body, and an adjustment unit including an actuation element arranged fixedly on a support element of the motor vehicle body and configured to aid movement of the air guiding element. The motor vehicle body further includes a receiving space configured to receive the air-guiding element, wherein the receiving space is arranged in a rear region of the motor vehicle body. The support element is designed in a form of a torsional profile for reinforcing a rear lid, forming the receiving space, of the rear region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
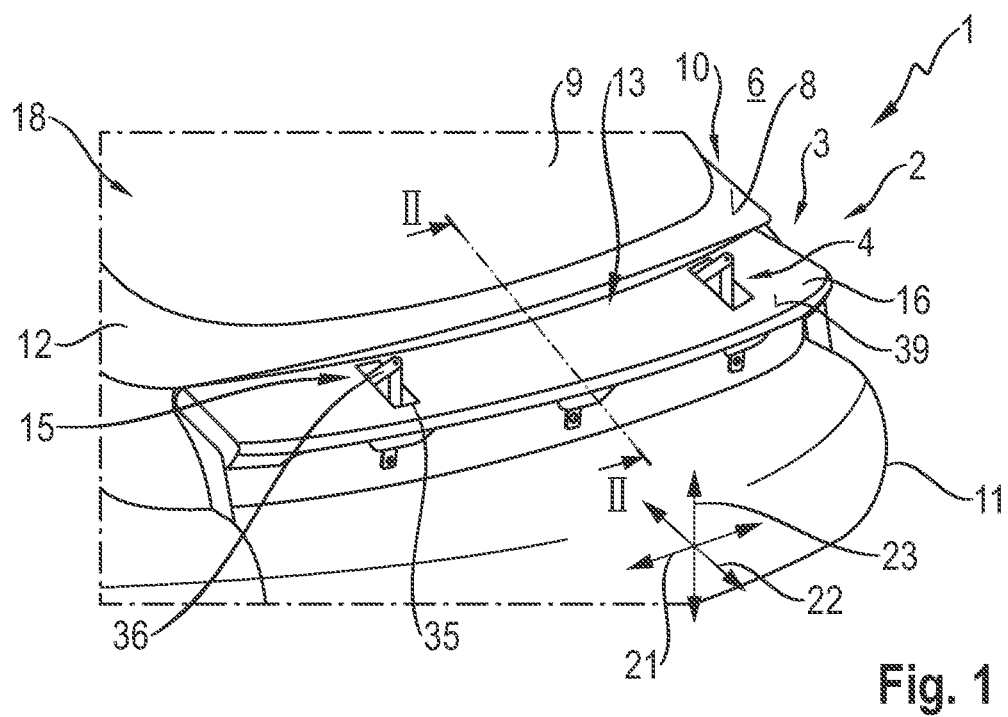
FIG. 1 shows, in a perspective detail illustration, a motor vehicle body with an air-guiding unit in a first exemplary embodiment with dismounted air-guiding element.

Embodiments of the present invention provide motor vehicle bodies having an air-guiding unit, wherein a gray area of the motor vehicle body is covered in particular when the air-guiding element is inclined, with improved stability of a body section receiving the air-guiding element simultaneously being effected.

A motor vehicle body according to the invention with an air-guiding unit has an air-guiding element of the air-guiding unit, which element is able to be positioned flush with the motor vehicle body. The air-guiding element is movably connected to the motor vehicle body, wherein, in the motor vehicle body, a receiving space for receiving the air-guiding element arranged in the rear region of the motor vehicle body is formed. The air-guiding unit comprises an adjustment unit with an actuation element, with the aid of which actuation element the air-guiding element is able to be moved. The actuation element is arranged fixedly on a support element of the motor vehicle body. The air-guiding element is arranged in a rear region of the motor vehicle body. According to embodiments of the invention, the support element can be designed in the form of a torsional profile for reinforcing a rear lid, forming the receiving space, of the rear region. The advantage of the support element designed in the form of a torsional profile can therefore be seen in the optimization of the stiffness of the rear lid. Furthermore, a reduction in the weight of the support element and thus of the entire motor vehicle body can be effected since, when connected to the rear lid, the support element can develop its full function and consequently, for the purpose of satisfying its supporting function, does not therefore already absolutely have to have on its own, that is to say without being connected to the rear lid, a strength which is satisfactory for the supporting function.

In one configuration of the motor vehicle body according to the invention, the support element is designed in the form of a gray-area cover, wherein said element is formed so as to cover the receiving space below the air-guiding element at least in the direction of a body transverse axis of the motor vehicle body and in the direction of a body longitudinal axis of the motor vehicle body. This means, in other words, that the support element extends transversely over the entire receiving space so that a receiving partial space formed between the rear lid and the support element is covered with respect to the surroundings. This is necessary in particular when the air-guiding element is extended or partially extended, in order that fouling of the adjustment device, in particular of the actuation element and the kinematic arrangement, can be prevented. Furthermore, the gray-area cover is advantageous for a design-related formation of the motor vehicle body. This means, in other words, that the receiving partial space formed below the air-guiding element is not or is only partly opened up by the gray-area cover, as is desired for a visual formation or the desired design of the motor vehicle body. However, the supporting function of the support element designed in the form of a gray-area cover is completely maintained. Above the support element, in other words meaning on the side formed so as to face away from the receiving partial space, there is furthermore formed sufficient space for receiving the air-guiding element.

The support element may be formed in a visually appealing manner at least on its surface which is formed so as to face the surroundings. For example, it is possible for at least the surface to be visually upgraded by powder coating or lacquering or the like, while at the same time maintaining the supporting function of the support element, in particular of the adjustment device.

For the purpose of further increasing the stiffness of the rear lid, the support element is received fixedly at the rear lid. This means, in other words, that said element is connected fixedly to the rear lid at least at one point, wherein the connection may be a form-/force-fitting connection and/or a materially-bonded connection. Even a pure form-fitting connection can increase the stiffness of the rear lid, as can a pure force-fitting connection. The advantage can be seen in guaranteed effecting of the increase in the stiffness of the rear lid.

In a further configuration of the motor vehicle body according to the invention, points of connection of the support element to the motor vehicle body are positioned in a non-visible region of the motor vehicle body. The non-visible region is the region of the motor vehicle body which, for a fully assembled motor vehicle body, is not visible to an observer from outside and without dismantling components. That is to say that in particular also when the air-guiding element is fully inclined or extended, the points of connection of the support element to the motor vehicle body, in particular to an outer wall of the rear lid, are not visible to the observer. This can be realized particularly advantageously with the aid of the torsional profile of the support element since end regions or ends of the support element in particular, which are provided for the at least contacting connection to the motor vehicle body, can be formed to be correspondingly inclined and/or bent off, so that these come to lie in the non-visible region.

Advantageously, for the purpose of avoiding visibility, it is equally possible for a cover element to be formed between the between the air-guiding element and the point of connection, which cover element covers the point of connection.

In a further configuration of the motor vehicle body according to the invention, the support element, which extends in the direction of a body longitudinal axis, is, at its first end, which is formed so as to face a passenger compartment of the motor vehicle body, connected with the aid of a fastening means to the rear lid, and is, at its second end, which is formed so as to face away from the first end, formed for support in the direction of the body longitudinal axis and/or in the direction of a body vertical axis at the motor vehicle body. This means, in other words, that, with the aid of the torsional profile of the support element, it is not absolutely necessary for both ends of the support element to be connected fixedly to the rear lid for the purpose of effecting the stiffness of the rear lid since one of the two ends is supported against the rear lid and consequently sufficient stiffness of the rear lid is effected.

In a further configuration, a bearing element is provided between the support element and the air-guiding element. Said bearing element is preferably produced from a plastic, in order that it can be provided in a lightweight and inexpensive manner. In addition to its design function, the bearing element also has a support element-protecting function since it is formed so as to fully cover said support element, in particular at the contact surface thereof which is formed so as to face the guiding element. Advantageously, it is possible for the bearing element to be visually formed in an inexpensive manner, for example by a corresponding coloring and/or surface structure.

The actuation element received at the support element is preferably received at the support element with the aid of a support arm such that vibrations of the support element cannot be transmitted, or can be transmitted only to a small extent, to the motor vehicle body. Equally, vibrations of the motor vehicle body during the operation thereof are not transmitted, or are transmitted only to a small extent, to the actuation element. In this way, secured operation of the actuation element is effected. Preferably, a damping element is received at the support arm.

For the purpose of weight reduction of the motor vehicle body, the support element is also formed for supporting a kinematic arrangement of the adjustment device. This means, in other words, that said support element serves not only for holding the actuation element but also for supporting the kinematic arrangement, by way of which the guiding element is brought into its corresponding positions and held in said positions. Since, in particular during driving operation, large forces act on the guiding element and thus on the kinematic arrangement and the actuation element, these may, owing to the support of the kinematic arrangement at the support element, be formed in a manner more optimized in terms of installation space and/or in a more lightweight manner since forces acting on the guiding element can, by way of the support, also be absorbed by the support element.

Figure 2:
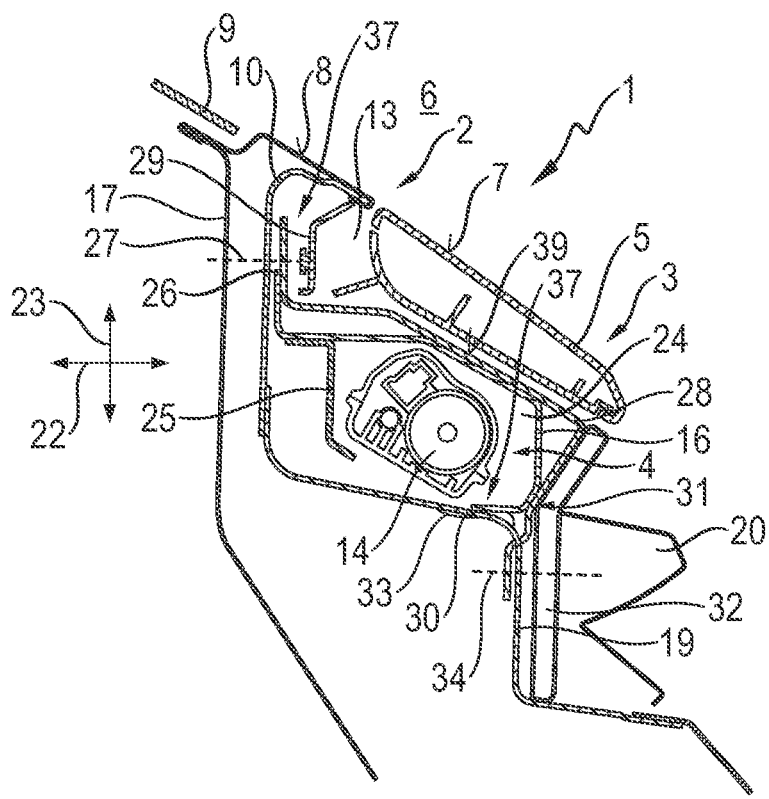
FIG. 2 shows the motor vehicle body according to FIG. 1 in a longitudinal section along the section line II-II.

A motor vehicle body 1 according to an embodiment of the invention, which is designed as per FIGS. 1 and 2 in a first exemplary embodiment, comprises an air-guiding unit 3, which is arranged in a rear region 2. With the aid of an adjustment unit 4, the air-guiding unit 3 is able to be adjusted from a first operating position into a second operating position. With the aid of the air-guiding unit 3, it is in particular possible for an air resistance coefficient and a downforce of the motor vehicle body 1 to be varied. The air-guiding unit 3 comprises at least one air-guiding element 5 for flow guidance, which is connected to the adjustment unit 4. The air-guiding element 5 is designed in the form of a rear wing and is referred to hereinafter as a wing. A wing surface 7, formed so as to face the surroundings 6, of the wing 4 is, in the retracted state, as illustrated in FIG. 2, arranged flush with a body surface 8, wherein this position corresponds to a first end position.

In the rear region 2, the motor vehicle body 1 has a rear window 9, a rear lid 10 and an integrated bumper 11, which are arranged between side walls 12 of the motor vehicle body 1. The rear lid 10 is formed with a receiving space 13 for receiving the air-guiding unit 3.

The adjustment unit 4 comprises an actuation element 14 in the form of an actuation motor which, by way of a kinematic arrangement 15 of the adjustment unit 4, is designed to be able to bring the wing 5 into its corresponding positions and to support said wing. The actuation element 14 is arranged fixedly on a support element 16.

The support element 16 is designed to receive all the components of the air-guiding unit 3 and in particular, since it serves for receiving the actuation element 14, has an in particular sufficiently high stiffness.

The rear lid 10 is formed from an inner wall 17, which forms a delimitation of the rear lid 10 in the direction of a passenger compartment 18. For delimitation with respect to the surroundings 6, the rear lid 10 has an outer wall 19. The outer wall 19 is formed for receiving a rear lamp 20.

The support element is designed in the form of a torsional profile, wherein it is designed so as to extend substantially along the rear lid 10 in the direction of a body transverse axis 21 of the motor vehicle body 1. In the direction of a body longitudinal axis 22, the support element 16 is of step-like design, so that it extends in the direction of a body vertical axis 23 and a receiving partial space 24 is formed between the outer wall 19 and the support element 16. The actuation element 14, in particular, is arranged in the receiving partial space 24. The actuation element 14 is fixed to the support element 16 with the aid of a support arm 25.

The support element 16 is, at its first end 26, which is formed so as to face the passenger compartment 18, connected fixedly to the outer wall 19, wherein a reinforcement of the rear lid 10 and thus of the motor vehicle body 1 is effected. That is to say, a point of connection 37 of the support element 16 with the rear lid 10 is formed in the region of the first end 26. The fixed connection is realized with the aid of fastening means 27 in the form of screws and thereby constitutes a releasable form-/force-fitting connection. Equally, the support element 16 could also be designed so as not to be releasable with respect to the outer wall 19, for example in the form of a rivet connection or a materially-bonded welded connection.

Positioned between the air-guiding element 5 and the support element 16 is a bearing element 28 which is preferably designed in the form of a plastic component, and thus in a lightweight and inexpensive manner, and in particular has a design function.

Cover elements 29, which are connected fixedly to the outer wall 19 and serve for covering and protecting the fastening means 27, are formed in the region of the fastening means 27.

The support element 16 designed in the form of a torsional profile is, at its second end 30, which is formed so as to face the bumper 11, formed so as to be bent in the direction of the passenger compartment 18, wherein, in the region of the bend 31, said element is supported against a body profile 32 of the motor vehicle body 1, which profile is arranged between the rear lamp 20 and the support element 16. Consequently, in the region of the second end 30 too, a point of connection 37 is formed between the rear lid 10 and the support element 16 by way of the supporting contact. Said point of connection 37 is formed below a support surface 39, formed so as to face the air-guiding element 5, of the support element 16 in the direction of the body vertical axis 23, and thus in the non-visible region.

For the purpose of securing the support element 16 to the outer wall 19, a clamping element 33 is provided, which establishes a secured connection between the outer wall 19 and the support element 16 in the region of the second end 30. Furthermore, the bearing element 28 is connected fixedly to the outer wall 19 by way of a further fastening means 34. Consequently, the bearing element 28 extends fully over the support element 16 in the direction of the body longitudinal axis 22 and additionally serves for securing the support element 16 against movement out of position.

Figure 3:
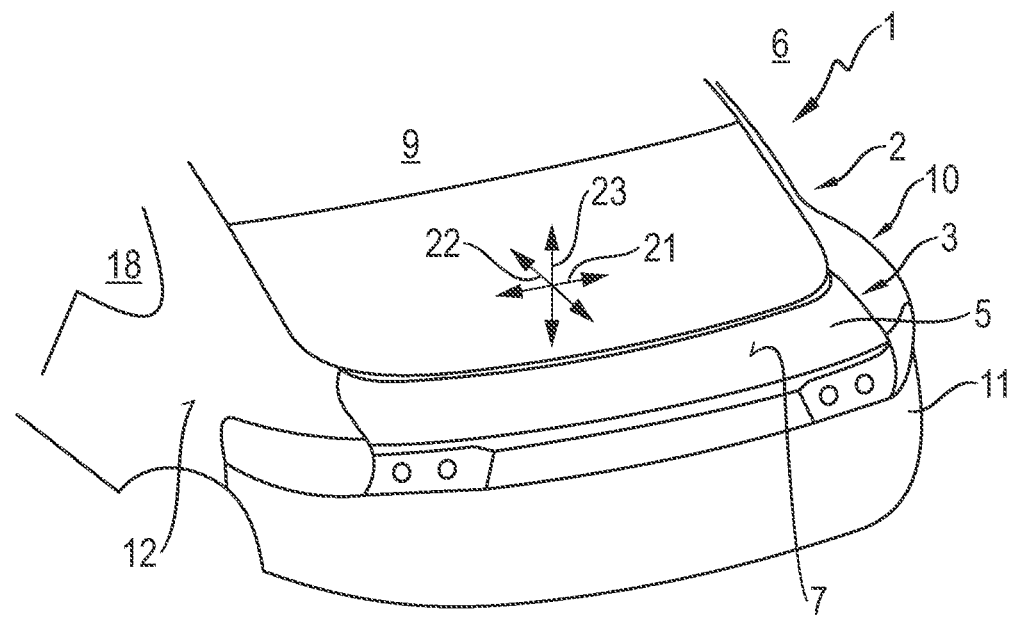
FIG. 3 shows, in a perspective detail illustration, a motor vehicle body according to an embodiment of the invention with a retracted air-guiding element.
Figure 4:
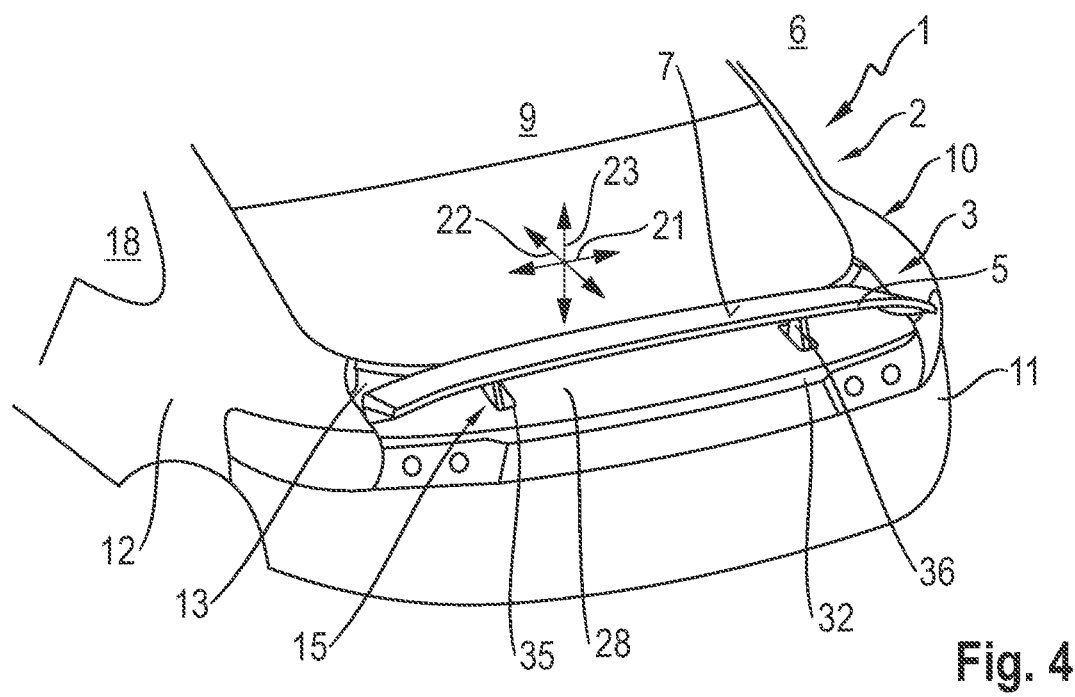
FIG. 4 shows, in a perspective detail illustration, the motor vehicle body according to FIG. 3 with an extended air-guiding element.
Figure 5:
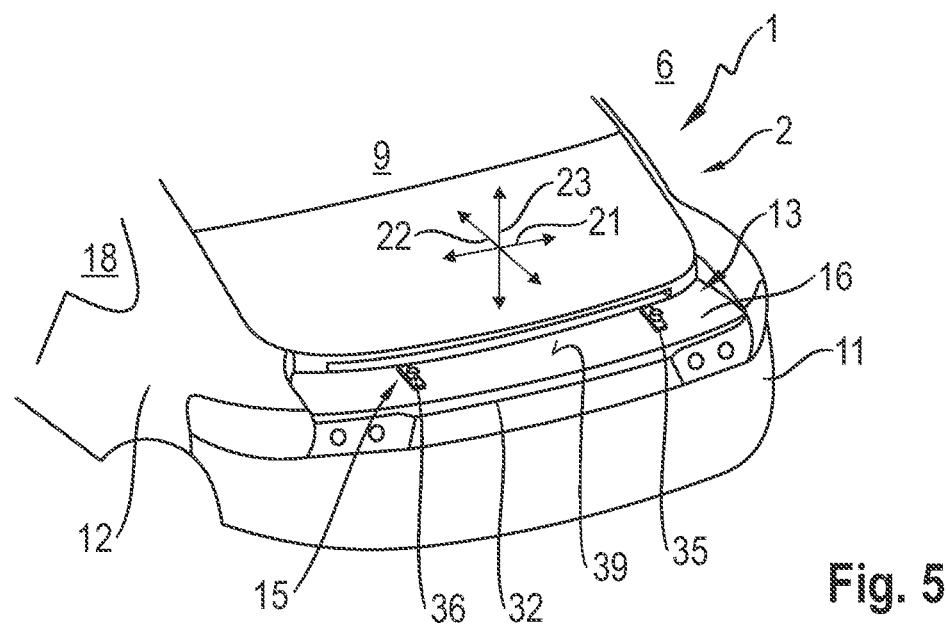
FIG. 5 shows, in a perspective detail illustration, the motor vehicle body according to FIG. 3 with dismounted air-guiding element.

FIGS. 3 and 5 illustrate the motor vehicle body 1 according to a second exemplary embodiment of the invention. The bearing element 28 is also formed so as to extend fully over the support element 16 in the direction of the body transverse axis 21 and, in addition to its visual and thus design function, also provides a protective function of the support element 16 (see FIG. 4).

Since the support element 16 is provided for covering the receiving space 13 and thus contributes to the formation of the receiving partial space 24, the support element 16 and, when the bearing element 28 is present, as is the case in the exemplary embodiments illustrated, also the bearing element 28 have in each case two passage openings 35 via which in each case one actuation arm 36 of the kinematic arrangement 15 can project out of the receiving partial space 24, which is covered with the aid of the support element 16, in order that the adjustment unit 4 can be connected to the air-guiding element 5.

Figure 6:
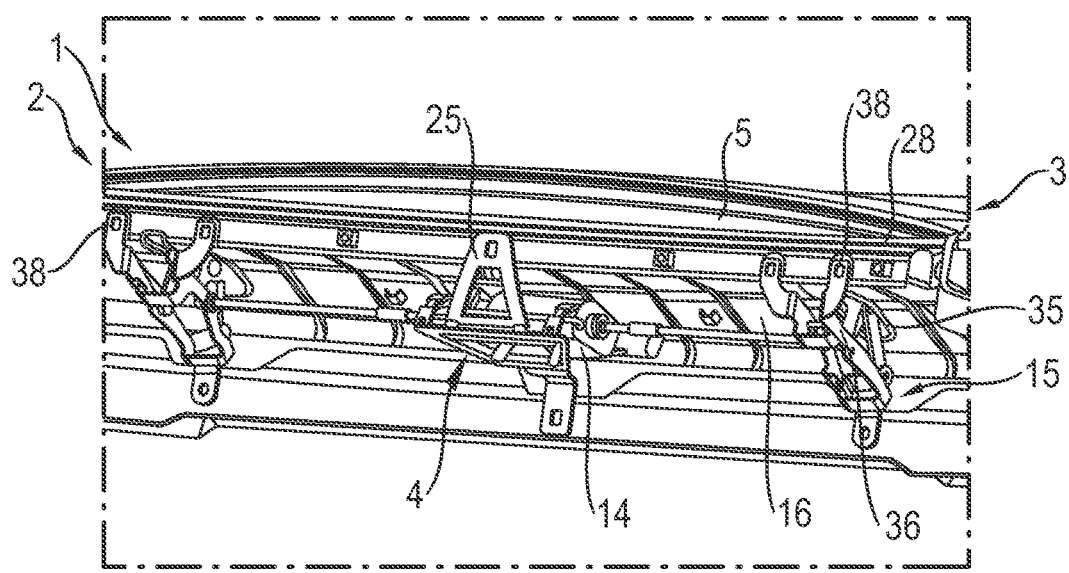
FIG. 6 shows, in a perspective detail illustration, a support element of a motor vehicle body.

FIG. 6 illustrates, in a perspective illustration, a detail of the support element 16. The support element 16 is formed so as to receive the actuation element 14 with the aid of the support arm 25. The actuation arms 36 each have four-point articulation and are supported against the support element 25 at their arm ends 38 which are formed so as to face away from the passage opening 35. Consequently, the support element 16 additionally serves to support the kinematic arrangement 15.

In a second end position, as is illustrated in principle in FIG. 4, the wing 5 includes an angle, which is less than 360°, with the body surface 8, wherein the wing 5 has been brought into said second end position with the aid of the adjustment unit 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle body, comprising:
    an air-guiding unit having:
        an air-guiding element configured to be positioned flush with the motor vehicle body and movably connected to the motor vehicle body, and
        an adjustment unit including an actuation element arranged fixedly on a support element of the motor vehicle body and configured to aid movement of the air guiding element; and
    a receiving space configured to receive the air-guiding element, wherein the receiving space is arranged in a rear region of the motor vehicle body
    wherein the support element is configured to reinforce a rear lid at the rear region of the motor vehicle body, the rear lid covering the receiving space,
    wherein the support element is, at a first end, which is formed so as to face a passenger compartment of the motor vehicle body, connected with the aid of a fastener to the rear lid in a direction of a body longitudinal axis, and is, at a second end, which is formed so as to face away from the first end, formed for support in the direction of the body longitudinal axis and/or in the direction of a body vertical axis of the motor vehicle body.

2. The motor vehicle body as claimed in claim 1, wherein the support element is formed so as to cover the receiving space at least in a direction of a body transverse axis of the motor vehicle body and in a direction of a body longitudinal axis of the motor vehicle body.

3. The motor vehicle body as claimed in claim 1, wherein the support element is received fixedly at the rear lid.

4. The motor vehicle body as claimed in claim 1, wherein points of connection of the support element to the motor vehicle body are positioned in a non-visible region of the motor vehicle body.

5. The motor vehicle body as claimed in claim 4, wherein a cover element is formed between the air-guiding element and the point of connection, which cover element covers the point of connection from the direction of the surroundings.

6. The motor vehicle body as claimed in claim 1, wherein the support element is connected to the motor vehicle body with the aid of a form-/force-fitting connection.

7. The motor vehicle body as claimed in claim 1, wherein a panel is provided between the support element and the air-guiding element.

8. The motor vehicle body as claimed in claim 1, wherein the actuation element is arranged at the support element with the aid of a support arm.

9. The motor vehicle body as claimed in claim 1, wherein the support element is formed for supporting a kinematic arrangement of the adjustment device.

10. The motor vehicle body as claimed in claim 7, wherein the panel extends fully over the support element in the direction of the body longitudinal axis, and is connected fixedly to an outer wall of the rear lid, and is configured to secure the support element.

* * * * *